T. B. De FOREST.

Assignor to S. A. De Forest.

SOCKETS FOR AGRICULTURAL IMPLEMENTS.

No. 7,567. Reissued March 27, 1877.

Witnesses.
J. H. Chumway
Clara Broughton

Thos. B. De Forest
Inventor
By atty
Wm. G. Eade

N. PETERS, PHOTO-LITHOGRAPHER, WASHINGTON, D. C.

UNITED STATES PATENT OFFICE.

THOMAS B. DE FOREST, OF BIRMINGHAM, CONNECTICUT, ASSIGNOR TO SARAH A. DE FOREST.

IMPROVEMENT IN SOCKETS FOR AGRICULTURAL IMPLEMENTS

Specification forming part of Letters Patent No. 152,085, dated June 16, 1874; reissue No. 7,567, dated March 27, 1877; application filed February 5, 1877.

*To all whom it may concern:*

Be it known that I, THOMAS B. DE FOREST, of Birmingham, in the county of New Haven and State of Connecticut, have invented a new Improvement in Sheet-Metal Socket for Shovels, &c; and I do hereby declare the following, when taken in connection with the accompanying drawings and the letters of reference marked thereon, to be a full, clear, and exact description of the same, and which said drawings constitute part of this specification, and represent, in—

Figure 1:
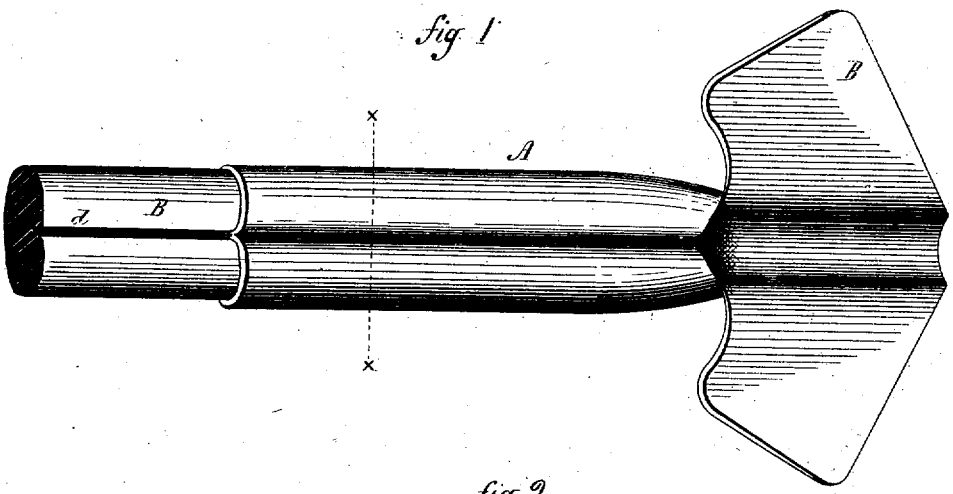
Figure 2:
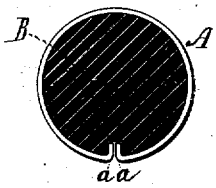

Figure 1, a top view, and in Fig. 2 a transverse section on line *x x* of Fig. 1.

This invention relates to an improvement in the manufacture of sockets for shovels, spades, scoops, hoes, and other articles which are usually constructed with a socket into which the handle is set, the object being to produce a strong socket for these and analogous articles from sheet metal without welding or riveting.

The invention consists in a tubular socket and pad formed complete from a single piece of sheet metal; also, in turning inward the meeting edges of the metal which forms the tubular part to produce an internal rib, which, embedded in the wood of the handle, prevents the turning of the handle, as well as strengthens the socket.

A is the socket, cut from a blank of sheet metal of an extent proportionate to the diameter of the socket, and with a heading or pad, B, adapted for attaching the socket to shovels, hoes, or analogous articles, as the case may be.

In order to the better securing of the handle and socket together, the width of the blank for the socket should be a little wider than the circumference of the socket, so that if brought to its diameter one edge will overlap the other. The two edges are turned inward, as at *a a*, Fig. 2, to form a longitudinal rib within the socket. This rib enters a previously-prepared groove in the handle, or, through sufficient power, is forced or embedded into the wood of the handle C. This prevents the socket from opening, and also prevents the socket from turning upon the handle.

Thus is produced a tubular socket complete in one piece, with the pad for attachment to the article for which such socket may be designed. The handle may be previously prepared with a groove, *d*, and inserted into the socket, the groove serving to properly locate the handle, as well as to hold the socket.

I claim—

1. A handle-socket and pad for attachment to shovels, hoes, and other articles, formed complete from a single piece of sheet metal, and substantially as described.

2. A handle-socket for shovels, hoes, or analogous articles, formed from sheet metal, the edges turned inward, so as to enter or be embedded into the handles, substantially as described.

THOMAS B. DE FOREST.

Witnesses:
JOHN E. EARLE,
CLARA BROUGHTON.